United States Patent Office 3,186,872
Patented June 1, 1965

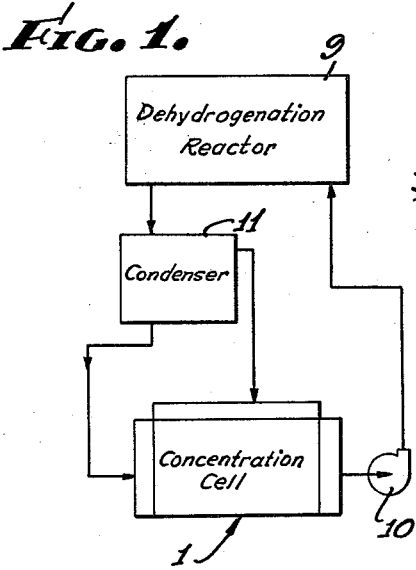
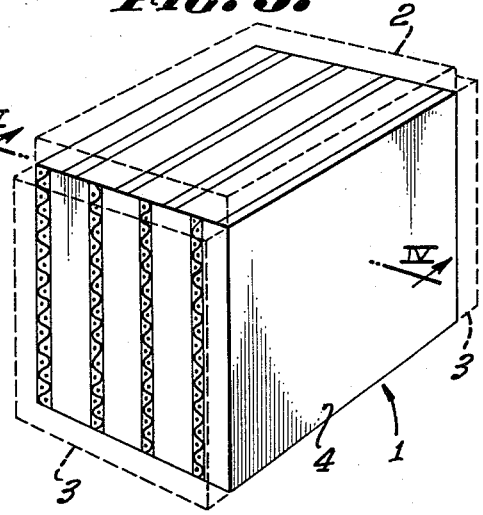
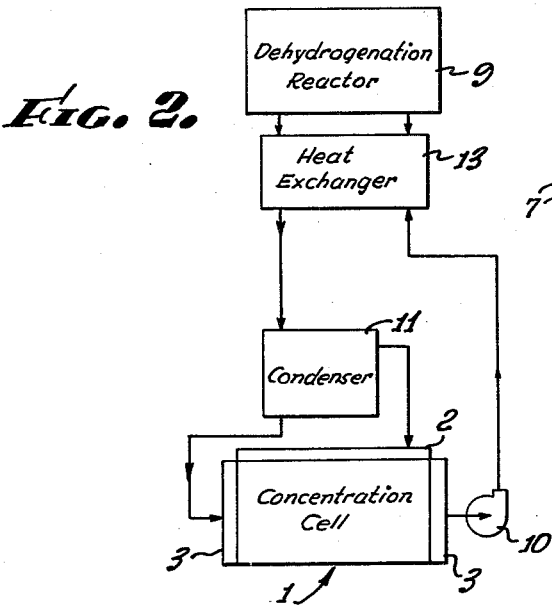
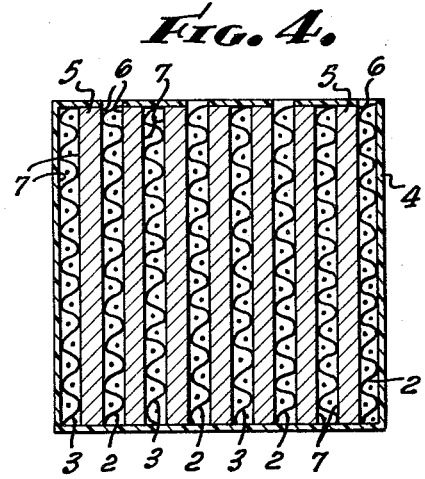
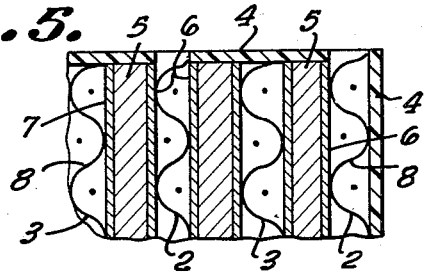
INVENTOR.
BLAND EWING

3,186,872
CONTINUOUS GAS CONCENTRATION CELL ENERGY CONVERSION
Bland Ewing, 860 Plum Ave., Riverside, Calif.
Filed Feb. 12, 1962, Ser. No. 172,730
12 Claims. (Cl. 136—86)

In general, the present invention relates to the conversion of thermal energy to electrical energy by means of a continuous gas concentration cell system. More particularly, the present invention relates to a compact continuous gas concentration cell having an unusually high pressure ratio.

At present the commonly used method for converting thermal energy into electrical energy is to use heat to generate steam which drives a turbine and the turbine in turn drives a generator. Such method necessarily involves heavy, large, expensive, complex equipment which entails constant maintenance, relatively low efficiency and a low power to weight ratio. Because of such shortcomings there has been extensive research and development with respect to methods and means for directly and simply converting thermal energy into electrical energy. However, presently known developments such as thermocouples have relatively low efficiencies.

The present invention provides both means and methods for converting thermal energy into electrical energy simply and efficiently. The present invention accomplishes such conversion with an extremely compact cell which may or may not use a liquid electrolyte. More important, the method and means of the present invention may isolate the source of thermal energy from the rest of the system so that heat loss is minimized and high thermal efficiency is obtained. In addition, the means of the present invention involves low rates of fluid flow and minimum heat loss in relation to the amount of electrical energy generated.

In general, an object of the present invention is the conversion of thermal energy to electrical energy simply and efficiently.

Another object of the present invention is to convert thermal energy into electrical energy by a continuous gas concentration cell having a high pressure ratio.

Still another object of the present invention is a cell system for converting thermal energy into electrical energy where the source of thermal energy may be isolated from the rest of the cell system to minimize heat loss and obtain high thermal efficiency.

Still another object of the present invention is an extremely compact and efficient gas concentration cell.

Other objects and advantages of this invention will be readily apparent from the following description and drawings which illustrate an exemplary embodiment of the present invention.

Broadly, the present invention involves first separating in a low temperature zone a body of gas containing hydrogen from a body of fluid containing hydrogen and a fluid reactant adapted to reversibly combine with hydrogen to form a fluid product with a barrier means impermeable to the components of said gas and fluid bodies. The barrier means also separates at least one pair of spaced electrodes in contact therewith with the first electrode contacting the body of gas and the second electrode contacting the body of fluid. In addition, the barrier means contains easily replaceable hydrogen ions and it is adapted to transport hydrogen ions between said electrodes. The partial pressure of the hydrogen in the body of fluid is then reduced in relation to the partial pressure of hydrogen in the body of gas by hydrogenating the fluid reactant with the hydrogen in said fluid body. A portion of said body of fluid is conducted to a high temperature dehydrogenation reactor where the hydrogenated fluid reactant is substantially dehydrogenated to hydrogen and fluid reactant. The hydrogen is then separated from the hydrogenated fluid reactant. The hydrogen is recycled to the body of gas and the fluid reactant and hydrogenated fluid reactant are recycled to the body of the fluid. In this way the difference in hydrogen partial pressure is maintained between the said electrodes and electrical energy is made available from said electrodes.

FIG. 1 is a schematic block diagram of an embodiment of the process and apparatus of the present invention.

FIG. 2 is a schematic block diagram of another embodiment of the process and apparatus of the present invention.

FIG. 3 is a perspective view of the interior portion of an embodiment of the gas concentration cell of the present invention.

FIG. 4 is a sectional view of the cell of FIG. 3 taken in the plane IV—IV of FIG. 3.

FIG. 5 is an enlargement of a portion of FIG. 4.

As shown in FIGS. 1 and 3–5, the continuous gas concentration cell system of the present invention includes a concentration cell 1, a dehydrogenation reactor 9 and a condenser 11. The concentration cell 1 has a high hydrogen gas partial pressure chamber 2 and a low hydrogen gas partial pressure chamber 3 contained in a housing 4 which are open to and separated by barriers 5 which are impermeable to the fluids contained in said chambers. The high hydrogen partial pressure chamber 2 contains a gas consisting essentially of hydrogen. The low hydrogen partial pressure chamber 3 contains a gas consisting essentially of hydrogen and a fluid reactant adapted to reversibly combine with the hydrogen to form a fluid product, e.g., 2-methyl naphthalene. The low hydrogen partial pressure is maintained by hydrogenating the fluid reactant with the hydrogen.

In contact with each barrier 5 and separated thereby are pairs of spaced electrodes 6 and 7 which consist of thin films of a metal such as palladium deposited on the gas barrier. One electrode 6 of each pair of said electrodes is in communication with chamber 2 while the other electrode 7 is in communication with chamber 3. The barriers 5 contain easily replaceable hydrogen ions and are adapted to transport hydrogen ions between said electrodes. The portions of chambers 2 and 3 between barriers 4 contain metal screens 8 which serve as a conductor making electrical contact with the surface of the electrodes 6 and 7. The metal screens 8 may be connected in parallel or in series as desired by suitable connections (not shown) and wires (not shown).

In communication with the low hydrogen partial pressure chamber 2 is the high temperature dehydrogenation reactor 9. Reactor 9 is maintained by thermal energy at a temperature sufficient to dehydrogenate at least part of the hydrogenated fluid reactant and produce hydrogen. The mixture of fluid reactant X and hydrogenated fluid reactant $H_nX$ from chamber 2 are pumped to reactor 9 by a suitable pump 10. The fluid mixture of hydrogen $H_2$, gaseous or liquid reactant X and hydrogenated gaseous or liquid reactant $H^nX$ produced by reactor 9 are then conducted to a separating means such as condenser 11. Where the dehydrogenation reaction in reactor 9 involves gaseous reactant X and gaseous hydrogenated reactant $H_nX$, the hydrogen is separated from the gaseous mixture by condensing the gaseous reactant and hydrogenated gaseous reactant in condenser 11. Then, from condenser 11, hydrogen is recycled to chamber 2 in concentration cell 1. If necessary another separation system (not shown) may be connected with chamber 2 to insure that hydrogen is maintained at a high concentration in chamber 2. Such additional separation system would remove impurities carried over the hydrogen from condenser 11. The liquid reactant X and hydrogenated liquid reactant $H_nX$ condensed in condenser 11 are then conducted directly to chamber 3. If desired, the liquid reactant X and hydrogenated reactant $H_nX$ may be vaporized in a vaporizer (not shown) prior to recycling to chamber 3. However, the reactant X and hydrogenated reactant $H_nX$ are preferably maintained in liquid form in chamber 3 because of the higher concentration obtained thereby.

Where the dehydrogenation reaction in reactor 9 involves liquid reactant X and hydrogenated reactant $H_nX$, then the separating means may involve merely a liquid-gas separator (not shown). The handling of the products, however, would be the same as set forth above.

The system shown in FIG. 2 is substantially the same as that of FIG. 1 except that a heat exchanger is added to increase the thermal efficiency of the system. In FIG. 2, heat exchanger 13 utilizes the heat of the fluid mixture produced by reactor 9 to preheat the fluid mixture entering reactor 9 from chamber 3 of concentration cell 1.

Except for the concentration cell 1, all parts of the system of present invention involve well known pieces of equipment. Thus, pump 10, condenser 11, and heat exchanger 13 may be standard equipment having the desired capacity for its given operation. The dehydrogenation reactor 9 may contain a bed of suitable catalyst to accelerate the desired dehydrogenation reaction. For example, to dehydrogenate decahydro-2-methylnaphthalene, i.e., 2-methyldecalin, a bed of charcoal palladium catalyst may be used.

The concentration cell 1 is shown in detail in FIGS. 3–5. The barriers 5 in cell 1 may consist of aqueous electrolyte solution such as 0.5 M HCl or $H_2SO_4$ contained by suitable plastic membranes such as polyethylene membranes. Likewise, barriers 5 may consist of an aqueous electrolyte solution absorbed in a porous plastic membrane. Preferably, however, barriers 5 are made of ion exchange membranes in hydrogen ion form. If the latter type of barrier is used, then the metal electrodes may consist of thin films of metal such as palladium deposited on the membrane. To secure better bonding between the metal film and the ion exchange membrane, the metallic ion may be diffused a short distance into the membrane from its surface and then reduced to metal by a suitable reducing agent such as hydrogen. This procedure is particularly useful when palladium is used since one of the functions of the palladium film is catalyzing the hydrogenation reaction and this procedure greatly increases the available catalytic surface.

To operate the system shown in FIGS. 1–5, chambers 2 and 3 are charged to a suitable pressure at a suitable temperature with their respective gases or liquids. For example, chamber 2 with hydrogen and chamber 3 with hydrogen and liquid 2-methylnaphthalene or gaseous benzene. Such pressure may be atmospheric; however, higher pressures of 10 atmospheres and above will increase the efficiency of the system and permit higher rates of current withdrawal. When benzene and atmospheric pressure is used, then the temperature must be above 82° C. to insure that it and its hydrogenated products remain in gaseous form. Higher temperatures such as 100° C. may be used to insure a high rate of hydrogenation. However, as noted below, the higher the temperature of the concentration cell, the lower the efficiency of the system. Thus, preferably liquid 2-methylnaphthalene at a temperature above its freezing point, e.g., 35° C., is used. In such case higher temperatures such as 60° C. may be used to increase the hydrogenation rate.

In any event, once the hydrogenation reaction is initiated, the hydrogen partial pressure in chamber 3 rapidly drops in relation to the hydrogen partial pressure in chamber 2. Meanwhile, the total pressure is preferably maintained approximately the same in chambers 2 and 3 to prevent subjecting the electrolyte bed to substantial pressure differences. Consequently, hydrogen partial pressures ratios of chamber 2 to chamber 3 of at least 100 and usually above 1000 can be obtained. Such hydrogen partial pressure ratios generate an electromotive force or voltage which can be computed from the following well-known equation:

(1) $$E = K \ln \frac{(P_3)}{(P_2)}$$

where $E$ = voltage generated;
$K$ = constant for a given absolute temperature;
$P_3$ = hydrogen pressure in chamber 3; and
$P_2$ = hydrogen pressure in chamber 2.

As soon as current is withdrawn from the cell, hydrogen gas is, in effect, transferred from chamber 2 to chamber 3 since hydrogen in consumed to electrodes 6 and produced at electrodes 7. Consequently, to maintain the pressure ratio between chamber 2 and chamber 3, the hydrogenated fluid reactant is withdrawn from chamber 3 and pumped to dehydrogenation reactor 9 which is maintained at a higher temperature, such as about 350° C. For example, if benzene or 2-methylnaphthalene are used and cyclohexane of 2-methyldecalin are their hydrogenation products, then such temperature must be below their decomposition temperature, i.e., about 450° C. The higher temperature shifts the equilibrium constant of the reaction to favor the production of hydrogen. The hydrogen thus produced may then be separated and recycled to chamber 2 while the benzene or 2-methylnaphthalene are separate and recycled to chamber 3. In this way, the hydrogen pressure ratio between chambers 2 and 3 may be maintained while electric current is withdrawn. It can be seen that in effect, the present invention converts the heat energy used to dehydrogenate cyclohexane to benzene or 2-methyldecalin to 2-methylnaphthalene into electrical energy. With reasonable simplifying assumption, e.g., $d(\Delta H)/dt = o$, it can be shown that the maximum electrical energy which can be obtained from this heat energy is given by the following equation:

(2) $$\Delta F = \Delta H \frac{(T_2 - T_1)}{(T_2)}$$

where:

$\Delta F$ = maximum electrical energy;
$\Delta H$ = heat energy of the reaction;
$T_2$ = temperature of the dehydrogenation reactor;
$T_1$ = temperature of the concentration cell.

Although the embodiment of the present invention described above involved gaseous benzene or liquid 2-methylnaphthalene, any stable, fluid reactant may be used which is adapted to reversibly combine with hydrogen. Stability in this context refers to a reactant which is not susceptible to side reactions and can withstand high temperatures without decomposing. Fluid means either normally gaseous or liquid at the operating temperature of the concentration cell. It has been found that the aromatic hydrocarbons such as benzene, naphthalene, anthracene, multi-phenyl compounds such as biphenyl and their alkylated products are preferable because of their stability, ease of hydrogenation and dehydrogenation and low melting points. Thus, one to six or more alkyl groups containing one to eight or more carbon atoms may be utilized as long as the resulting compounds have a sufficiently low melting point, e.g., methylnaphthalene. It should be noted that such fluid reactants that have high enough boiling points may be used in their liquid form so that separation of the hydrogen from the dehydrogenated reactant can be done directly without requiring condensation of the fluid reactant. In any event, any other hydrogenation reaction may be used to practice the present invention, which involves stable, fluid reactants which reversibly combine with hydrogen. It is also possible that other reactions such as oxidation and chlorination may be used in place of the hydrogenation reaction. Thus, such cells would depend on maintaining a difference of oxygen or chlorine pressure to generate electric current.

One of the main features of the present invention is a continuous gas concentration cell operating in a relatively low temperature range in which the hydrogen pressure difference across the cell is maintained by continuously hydrogenating a fluid reactant. The hydrogenated fluid reactant is then continuously dehydrogenated at a higher temperature with thermal energy. The products are subsequently continuously separated and recycled to their respective cell chambers.

Another feature of the present invention is the compact, efficient concentration cell used. As shown in the figures, the barriers and their associated electrodes may be thin sheets so an individual cell may be only a small fraction of an inch thick. The individual cells are simply separated by a fine metal screen which supports the cells and also provides spacing to permit fluid flow. More important, the screen serves as a conductor making electrical contact at many points and thus reduces electrode resistance. With this structure, a battery of cells may be made merely by stacking and having the fluid flow to the high and low pressure electrodes run through the battery at right angles shown in the figures.

Still another feature of the present invention is the use of a thin film of palladium as an electrode in the present invention. Such structure serves not only as an electrode, but also as a catalyst to prevent hydrogen overvoltage and as a catalyst for the hydrogenation reaction. Other metals such as platinum may be used to serve these functions. However, in addition, palladium has the unique characteristic of passing hydrogen to permit the cell reactions to proceed while serving as a solid barrier for the electrolyte and other gases. Such use of palladium makes possible a complete separation of the cell reactions and the hydrogenation reaction. Thus, palladium may be used as a solid wall unlike other metals which require openings to permit hydrogen to reach the electrode-electrolyte interface. It should be noted that this latter characteristic of palladium may be utilized to separate hydrogen gas from the fluid reactant. Thus, if such mixture is passed to a chamber bounded by a thin sheet of palladium, the hydrogen will diffuse through such sheet while the fluid reactant will be retained in the chamber.

It will be understood that the foregoing description and drawings are only illustrative of the present invention and it is not intended that the invention be limited thereto. Many other specific embodiments of the present invention will be obvious to one skilled in the art in view of this disclosure. All substitutions, alterations and modifications of the present invention which come within the scope of the following claims or to which the present invention is readily susceptible without departing from the spirit and scope of this disclosure are considered part of the present invention.

I claim:

1. A simple, efficient method of continuously converting thermal energy into electrical energy which comprises:
 (a) separating in a low temperature zone a first body of fluid consisting essentially of hydrogen gas from a second body of fluid consisting essentially of hydrogen and methylnaphthalene with a barrier means impermeable to the components of said fluid bodies, said barrier means separating at least one pair of spaced electrodes in contact therewith, the first of said electrodes contacting said first body of fluid and the second of said electrodes contacting said second body of fluid and said barrier means containing easily replaceable hydrogen ions and being adapted to transport hydrogen ions between said electrodes;
 (b) reducing the partial pressure of hydrogen gas in said second body of fluid in relation to the hydrogen gas partial pressure in said first body of fluid by hydrogenating the methylnaphthalene with the hydrogen in said second body of fluid;
 (c) conducting a portion of said second body of fluid to a high temperature zone, said high temperature zone being maintained by thermal energy at a temperature sufficient to substantially change the equilibrium constant of said hydrogenation reaction from its value in said low temperature zone to favor the production of hydrogen;
 (d) dehydrogenating at least part of said hydrogenated methylnaphthalene in said fluid portion in said high temperature zone to hydrogen and methylnaphthalene;
 (e) separating the hydrogen from the methylnaphthalene and hydrogenated methylnaphthalene in the fluid produced by said high temperature zone;
 (f) recycling said separated hydrogen to said first body of fluid; and
 (g) recycling said separated methylnaphthalene and hydrogenated methylnaphthalene to said second body of fluid, whereby said difference in hydrogen partial pressure is maintained between said electrodes and electrical energy is made available from said electrodes.

2. A method as stated in claim 1 wherein the fluids produced by said high temperature zone are passed in heat exchange relationship to the fluid being conducted to said high temperature zone.

3. A method as stated in claim 1 wherein the fluid produced by said high temperature zone is conducted to a separating zone removed from said high temperature zone and the hydrogen is separated from the methylnaphthalene and hydrogenated methylnaphthalene in said separating zone.

4. A method as stated in claim 1 wherein hydrogen is separated from the methylnaphthalene and hydrogenated methylnaphthalene by condensing the methylnaphthalene and hydrogenated methylnaphthalene.

5. A method as stated in claim 4 wherein the methylnaphthalene and hydrogenated methylnaphthalene are maintained in liquid form in both the high temperature zone and low temperature zone.

6. A simple, efficient method of continuously converting thermal energy into electrical energy which comprises:
 (a) separating in a low temperature zone a first body of fluid consisting essentially of hydrogen gas from a second body of fluid consisting essentially of hydrogen and a fluid aromatic hydrocarbon adapted to reversibly combine with hydrogen to form a fluid product with a barrier means impermeable to the components of said fluid bodies, said barrier means separating at least one pair of spaced electrodes in contact therewith, the first of said electrodes contacting said first body of fluid and the second of said electrodes contacting said second body of fluid and said barrier means containing easily replaceable hydrogen ions and being adapted to transport said hydrogen ions between said electrodes;
 (b) reducing the partial pressure of hydrogen in said second body of fluid in relation to the hydrogen partial pressure in said first body of fluid by hydrogenating said aromatic hydrocarbon with said hydrogen in said second body of fluid;
 (c) conducting a portion of said second body of fluid to a high temperature zone, said high temperature zone being maintained by thermal energy at a temperature sufficient to substantially change the equilibrium constant of said hydrogenation reaction from its value in said low temperature zone to favor the production of hydrogen;

(d) dehydrogenating at least part of said hydrogenated aromatic hydrocarbon in said fluid portion in said high temperature zone to hydrogen and aromatic hydrocarbon;

(e) separating the hydrogen from the aromatic hydrocarbon and the hydrogenated aromatic hydrocarbon in the fluid produced by said high temperature zone;

(f) recycling said separated hydrogen to said first body of fluid; and (g) recycling said separated aromatic hydrocarbon and hydrogenated aromatic hydrocarbon to said second body of fluid, whereby a difference in hydrogen partial pressure is maintained between said electrodes and electrical energy is made available from said electrodes.

7. A method as stated in claim 6 wherein said aromatic hydrocarbon is a low melting member of the group consisting of benzene, naphthalene, anthracene, biphenyl, alkylated benzenes, alkylated naphthalenes, alkylated anthracenes, and alkylated biphenyls, said alkylation consisting of one to six alkyl groups containing one to eight carbon atoms.

8. A simple, efficient method of continuously converting thermal energy into electrical energy which comprises:

(a) separating in a low temperature zone a first body of fluid consisting essentially of hydrogen gas from a second body of fluid consisting essentially of hydrogen gas and a fluid reactant adapted to reversibly combine with hydrogen to form a fluid product with a barrier means impermeable to the components of said fluid bodies, said barrier means separating at least one pair of spaced electrodes in contact therewith, the first of said electrodes contacting said first body of fluid and the second of said electrodes contacting said second body of fluid and said barrier means containing easily replaceable hydrogen ions and being adapted to transport hydrogen ions between said electrodes;

(b) reducing the pressure of hydrogen in said second body of fluid in relation to the hydrogen pressure in said first body of gas by hydrogenating said fluid reactant with said hydrogen in said second body of fluid;

(c) conducting a portion of said second body of fluid to a high temperature zone, said high temperature zone being maintained by thermal energy at a temperature sufficient to substantially change the equilibrium constant of said hydrogenation reaction from its value in said low temperature zone to favor the production of hydrogen;

(d) dehydrogenating at least part of said hydrogenated fluid reactant in said fluid portion in said high temperature zone to hydrogen and the fluid reactant;

(e) separating said hydrogen from said fluid reactant and hydrogenated fluid reactant;

(f) recycling said separated hydrogen to said first body of fluid; and (g) recycling said separated fluid reactant and hydrogenated fluid reactant to said second body of fluid, whereby a difference in hydrogen partial pressure is maintained between said electrodes and electrical energy is made available from said electrodes.

9. A simple, efficient gas concentration cell system for continuously converting thermal energy into electrical energy which comprises:

(a) a high hydrogen gas pressure chamber and a low hydrogen gas pressure chamber open to and separated by a barrier means impermeable to the gas contained in said chambers, said high pressure chamber containing a gas consisting essentially of hydrogen and said low pressure chamber containing a fluid consisting essentially of hydrogen and a fluid reactant adapted to reversibly combine with hydrogen to form a fluid product;

(b) a pair of spaced electrodes separated by said barrier means and in contact therewith, the first of said electrodes being in communication with said high pressure chamber and the second of said electrodes being in communication with said low pressure chamber, said gas barrier means containing easily replaceable hydrogen ions and being adapted to transport hydrogen ions between said electrodes;

(c) a high temperature dehydrogenation reactor in communication with said low pressure chamber adapted to dehydrogenate the fluid mixture received from said low pressure chamber to increase the pressure of hydrogen in said fluid mixture;

(d) separating means in communication with said reactor for separating hydrogen gas from the fluid mixture, produced by said reactor;

(e) means for recycling the hydrogen gas from said separating means to said high hydrogen gas pressure chamber; and (f) means for recycling the remaining portion of said fluid mixture from said separating means to said low hydrogen gas pressure chamber.

10. A system as stated in claim 9 wherein said electrodes comprise thin films of palladium deposited on said gas barrier means.

11. A system as stated in claim 9 which includes means for passing the fluid mixture produced by said reactor in heat exchange relationship to the fluids being conducted to said reactor.

12. A system as stated in claim 9 wherein said separating means include:

(a) means for condensing the fluid reactant and hydrogenated fluid reactant from reactor.

References Cited by the Examiner

UNITED STATES PATENTS 3,031,518    4/62    Werner et al. _____ 136—86

JOHN H. MACK, *Primary Examiner.*

JOHN R. SPECK, *Examiner.*